US012194770B2

(12) United States Patent
Trassl et al.

(10) Patent No.: US 12,194,770 B2
(45) Date of Patent: Jan. 14, 2025

(54) SECURITY ELEMENT HAVING REFLECTIVE AND STATIC FEATURES

(71) Applicant: Hueck Folien Gesellschaft m.b.H., Baumgartenberg (AT)

(72) Inventors: Stephan Trassl, Baumgartenberg (AT); Anita Fuchsbauer, Linz (AT); Marco Mayrhofer, Baumgartenberg (AT); David Brandstetter, Perg (AT); Philipp Nothdurft, Saxen (AT)

(73) Assignee: Hueck Folien Gesellschaft m.b.H., Baumgartenberg (AT)

(*) Notice: Subject to any disclaimer, the term of this patent is extended or adjusted under 35 U.S.C. 154(b) by 0 days.

(21) Appl. No.: 18/266,873

(22) PCT Filed: Dec. 15, 2021

(86) PCT No.: PCT/EP2021/085959

§ 371 (c)(1),
(2) Date: Jun. 13, 2023

(87) PCT Pub. No.: WO2022/129207

PCT Pub. Date: Jun. 23, 2022

(65) Prior Publication Data

US 2024/0100873 A1 Mar. 28, 2024

(30) Foreign Application Priority Data

Dec. 18, 2020 (EP) .................................... 20215525

(51) Int. Cl.
*B42D 25/328* (2014.01)
*B42D 25/29* (2014.01)
(Continued)

(52) U.S. Cl.
CPC ......... *B42D 25/328* (2014.10); *B42D 25/324* (2014.10); *B42D 25/364* (2014.10);
(Continued)

(58) Field of Classification Search
CPC ............................ B42D 25/328; B42D 25/324
(Continued)

(56) References Cited

U.S. PATENT DOCUMENTS 5,801,857 A 9/1998 Heckenkamp et al.
5,808,758 A 9/1998 Solmsdorf
(Continued)

FOREIGN PATENT DOCUMENTS

EP 0 420 261 A2 4/1991
EP 0 723 246 A2 7/1996
(Continued)

OTHER PUBLICATIONS

International Search Report in PCT/EP2021/085959, mailed Jun. 7, 2022.

*Primary Examiner* — Justin V Lewis
(74) *Attorney, Agent, or Firm* — Collard & Roe, P.C.

(57) ABSTRACT

A security element for securities or security papers has at least one first region having first structures, which first structures reflect a first piece of information into different spatial regions, so that a movement image is created for a viewer with corresponding movement of a light source and/or a change in the viewing angle. When the light source and/or when the viewing angle is changed, a movement of the first piece of information is simultaneously created. The security element is thereby formed with at least one second region having second structures, which second structures reproduce a static and/or viewing angle-independent second piece of information. In addition, a process manufactures a security element.

18 Claims, 5 Drawing Sheets

Figure 1:
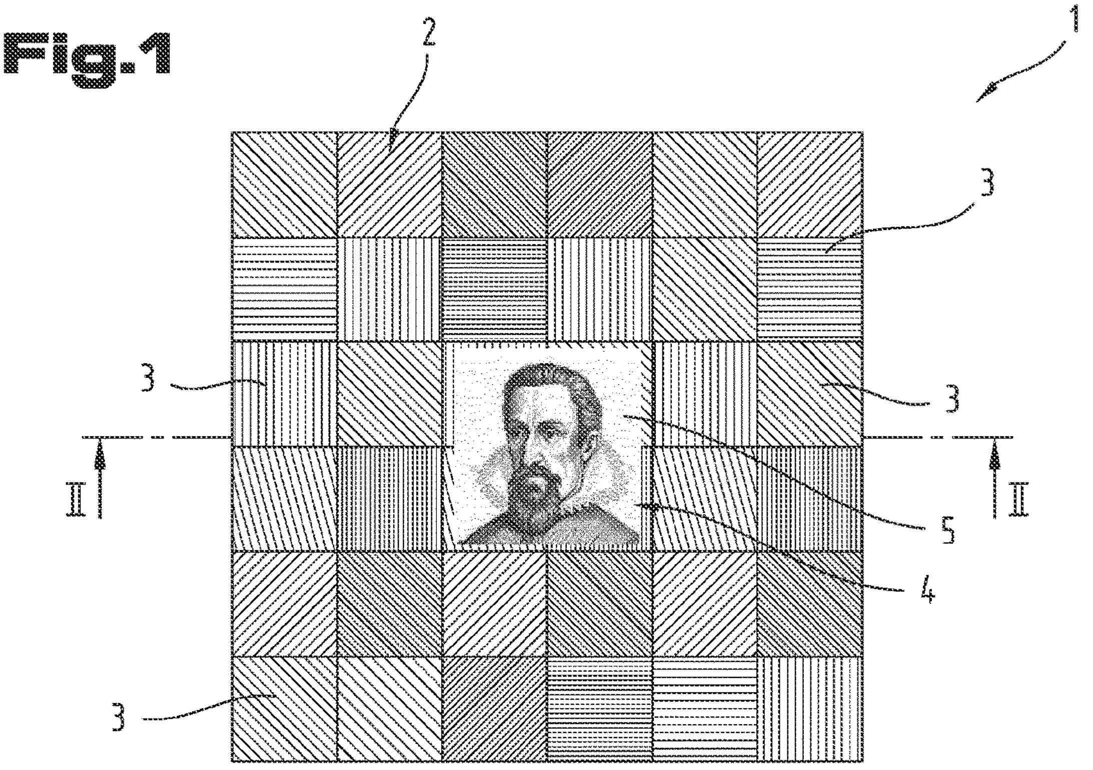

(51) Int. Cl.

| | |
|---|---|
| ***B42D 25/324*** | (2014.01) |
| ***B42D 25/364*** | (2014.01) |
| ***B42D 25/369*** | (2014.01) |
| ***B42D 25/373*** | (2014.01) |
| ***B42D 25/425*** | (2014.01) |

(52) U.S. Cl.
CPC ......... *B42D 25/369* (2014.10); *B42D 25/373* (2014.10); *B42D 25/425* (2014.10); *B42D 25/29* (2014.10)

(58) Field of Classification Search
USPC .................... 283/67, 70, 72, 91, 94, 98, 901
See application file for complete search history.

(56) References Cited

U.S. PATENT DOCUMENTS

| | | | | |
|---|---|---|---|---|
| 6,337,752 | B1 | 1/2002 | Heckenkamp et al. | |
| 6,954,293 | B2 | 10/2005 | Heckenkamp et al. | |
| 9,731,538 | B2 | 8/2017 | Seils et al. | |
| 10,189,294 | B2 | 1/2019 | Raymond et al. | |
| 10,525,759 | B2 | 1/2020 | Rahm et al. | |
| 2015/0331160 | A1 | 11/2015 | Rogin et al. | |
| 2016/0339733 | A1* | 11/2016 | Holmes | B42D 25/369 |
| 2020/0047538 | A1* | 2/2020 | Schmidegg | B42D 25/387 |

FOREIGN PATENT DOCUMENTS

| | | | |
|---|---|---|---|
| EP | 2 441 593 | A1 | 4/2012 |
| EP | 2 782 765 | B1 | 12/2015 |
| EP | 2 632 739 | B1 | 2/2017 |
| EP | 2 885 135 | B1 | 1/2018 |
| EP | 3 372 420 | A1 | 9/2018 |
| EP | 3 362 827 | B1 | 9/2021 |
| WO | 01/03945 | A1 | 1/2001 |
| WO | 2007/079851 | A1 | 7/2007 |
| WO | 2014/124781 | A1 | 8/2014 |
| WO | 2015/107347 | A1 | 7/2015 |

* cited by examiner

SECURITY ELEMENT HAVING REFLECTIVE AND STATIC FEATURES

CROSS REFERENCE TO RELATED APPLICATIONS

This application is the National Stage of PCT/EP2021/085959 filed on Dec. 15, 2021, which claims priority under 35 U.S.C. § 119 of European Application No. 20215525.5 filed on Dec. 18, 2020, the disclosure of which is incorporated by reference. The international application under PCT article 21(2) was not published in English.

The invention relates to a security element for securities or security papers, wherein the security element is formed with at least one first region having first structures, which first structures reflect a first piece of information into different spatial regions, so that a movement image is created for a viewer when a light source is moved accordingly and/or when a viewing angle is changed, wherein a movement of the first piece of information is created simultaneously when the light source is moved and/or the viewing angle is changed. The invention also relates to a process of manufacturing a security element.

Security elements of the type mentioned above are usually used to increase the protection against counterfeiting of securities or security papers, such as banknotes, ID cards, credit cards, ATM cards, tickets, etc.

The object of the present invention is to provide a security element with increased protection against counterfeiting.

According to the invention, this object is solved by a security element of the aforementioned type in that the security element is formed with at least one second region having second structures, which second structures reproduce a static and/or viewing angle-independent second piece of information.

By combining two technologies or two different types of security features, the solution according to the invention significantly increases the protection against counterfeiting of security elements for securities or security papers. The combination of structures that generate a movement image with static and/or viewing angle-independent features enables a high degree of customizability, or a wide variety of design options. This is accompanied by a significant increase in protection against counterfeiting.

According to an advantageous further advancement, it can be provided that the first structures are formed as diffractive structures, as micromirrors, as beam-optically effective facets or as achromatic, reflective structures.

The formation of the first structures as diffractive structures has become known, for example, from EP2782765B1 and EP2885135B1 as well as from WO2015107347A1. A design of the first structures as micromirrors has become familiar to those skilled in the art, for example, from U.S. Ser. No. 10189294A1 as well as from EP3362827A1. A facet-like design of the structures is known, for example, from EP2632739A1.

According to a further embodiment, it may be advantageous that the second structures are formed by diffusely scattering structures. Preferably, the second structures can be formed by diffusely scattering structures with a size of 1 μm to 100 μm. The formation of the second structures as diffusely scattering structures is known to those skilled in the art, for example, from EP2441593A1.

Furthermore, it can be expedient if the first region surrounds the second region at least in sections. In this way, a wide variety of designs can be realized. At this point, it should be expressly noted that the regions are formed into individual sub-regions. For example, the second region may comprise a plurality of sub-regions which may be at least partially surrounded by the first region. It may also be the case that the first region surrounds the second region at least in sections, whereby a distance may be provided between the two regions by which the two regions are spaced apart from each other. In such a distance region, for example, a further region with a security feature known to the person skilled in the art can also be formed.

Furthermore, it may be provided that the first piece of information and/or the second piece of information is formed as a letter, number, character, symbol or part of an image or pattern.

Furthermore, it may be provided that it has a carrier layer of plastic, in particular of a translucent and/or thermoplastic plastic, wherein the carrier layer preferably comprises at least one of the materials from the group comprising polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethyleneimide (PEI), polysulfone (PSU), polyaryletherketone (PAEK), polyethylene naphthalate (PEN), liquid-crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinyl chloride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or blends and/or copolymers of these materials, or is made from at least one of these materials.

Here, it would also be conceivable that the first region is arranged on one side of the carrier layer and that the second region is arranged on the other side of the carrier layer. This can be particularly useful if the carrier layer is transparent and at least approximately transparent. In this case, it would not necessarily be apparent to a viewer that the two regions are not formed on the same side of the carrier layer. For example, a viewer may have the optical impression that the first region surrounds the second region at least in sections, although the regions are actually applied to different sides of the security element.

It is possible that the security element is attached to a security or a security paper with the carrier layer side, i.e. with the side facing away from a visible side of the security element. Alternatively, of course, it is also conceivable that the carrier layer is formed on the visible side, i.e. on the outer side of the security element. In this case, it may be advantageous if the carrier layer is formed to be translucent or even transparent. In addition, it may also be advantageous if the carrier layer is formed as a transfer layer, the transfer layer being completely removable without leaving any residue after application of the security element to a security paper.

Advantageous is also an embodiment according to which it can be provided that the carrier layer has a thickness of 5 μm to 1000 μm, particularly preferably a thickness of 10 μm to 50 μm.

Furthermore, it may be expedient if a plurality of the first structures form a group whose orientations are coordinated with each other such that they image a point of the first piece of information in an observation space, wherein the first piece of information is composed of the sum of all points represented by the group, and wherein a movement of the point in the observation space is generated by changing a direction of incidence of the light generated by the light source and/or by changing of the angle of observation.

Furthermore, it can be provided that the security element is formed with at least one third region having third structures, which third structures are formed by a layer with color-tipping pigments, in particular interference pigments, pigments with a color-tipping thin-film structure or liquid-crystal pigments, or by a layer with a color-tipping thin-film structure, and/or that the third structures are formed by at least one liquid-crystal layer, in particular a cholesteric liquid-crystal layer, and/or in that the third structures are formed on a side facing away from a visible side with at least one layer which enhances a color-tipping effect, and/or in that the third structures contain metallic pigments and/or magnetic pigments and/or color pigments and/or dyes, and which third structures reproduce third piece of information, wherein the first region and the third region and/or the second region and the third region at least partially overlay each other. Thus, for example, further coatings or structures with optical effects of the most varied kind can be present above and also next to the first and second structures, which have additional optical effects. Of course, corresponding combinations of the most diverse coatings or security features are also possible. For example, it can also be advantageous if both the first structures and the second structures are covered or overlaid by the third structures, at least in certain regions. To further increase the protection against counterfeiting, such coatings can also be present only partially. An embodiment according to which the third structures are formed as a color-tipping coating and according to which additional structures are formed with a reflective effect, for example caused by a metallic coating, can also be advantageous here. These third structures and further structures can at least partially overlay the first and/or the second region.

If the third structures contain metallic pigments and/or magnetic pigments and/or color pigments and/or dyes, and thus do not create a color-tipping effect, an arrangement according to which the third structures are arranged on a reflective layer with a high refractive index described below may be appropriate. For example, a color lacquer layer can be arranged on a so-called HRI layer.

In particular, if the third structures are formed with a layer containing color-tipping pigments or those formed with a color-tipping thin-film structure, they may comprise at least one absorber layer and at least one distance layer.

The formation of a third region with third structures can contribute in an advantageous way to an additional increase of the design possibilities and thus the protection against counterfeiting. For example, the color-tipping thin-film structure or color-tipping pigments can have at least one absorber layer and at least one distance layer made of a dielectric material. In addition, it is conceivable that the thin-film structure comprises at least one reflective layer, wherein the distance layer can be arranged between the reflective layer and the absorber layer.

The absorber layer, distance layer and reflective layer can be applied to the first and/or second structures, in particular printed and/or vapor-deposited. Depending on which side of the security element is regarded as the visible side, different layer sequences are conceivable or appropriate. For example, a structure with a sequence "carrier layer or layer having a first and/or a second structure introduced therein—reflective layer—distance layer—absorber layer" can be provided. Alternatively, a structure with a sequence "carrier layer or layer having a first and/or a second structure introduced therein—absorber layer—distance layer—reflective layer" is also conceivable. The visible side is always the side from which a viewer looks from the absorber layer towards the reflective layer.

It should be noted at this point that the phrase "a layer is applied to something" should be understood to mean that the layer may be applied directly, or that there may still be one or more intermediate layers between the applied layer and that something to which the layer is applied. It should also be noted at this point that one or more intermediate layers may be arranged between the layers described in this document. Thus, it is not mandatory that the described layers contact each other. It should also be noted that the term layer in this document is to be understood as meaning that a layer can also be made up of several sub-layers.

An absorber layer may comprise at least one metallic material, in particular selected from the group of nickel, titanium, vanadium, chromium, cobalt, palladium, iron, tungsten, molybdenum, niobium, aluminum, silver, copper and/or alloys of these materials, or may be made of at least one of these materials.

A distance layer may comprise at least one low refractive dielectric material having a refractive index less than or equal to 1.65, in particular selected from the group consisting of alumina ($Al_2O_3$), metal fluorides, for example magnesium fluoride ($MgF_2$), aluminum fluoride ($AlF_3$), cerium fluoride ($CeF_3$), sodium aluminum fluorides (e.g. $Na_3AlF_6$ or $Na_5Al_3F_{14}$), silicon oxide ($SIO_x$), silicon dioxide ($SiO_2$), neodymium fluoride ($NdF_3$), lanthanum fluoride ($LaF_3$), samarium fluoride ($SmF_3$), barium fluoride ($BaF_2$), calcium fluoride ($CaF_2$), lithium fluoride (LiF), low refractive index organic monomers and/or low refractive index organic polymers or at least one high refractive index dielectric material having a refractive index greater than 1.65, in particular selected from the group consisting of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron(II,III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or be made from at least one of these materials.

The at least one reflection layer can be at least one metallic material, in particular selected from the group silver, copper, gold, platinum, aluminum, niobium, tin, or from nickel, titanium, vanadium, chromium, cobalt and palladium or alloys of these materials, in particular cobalt-nickel alloys or at least one highly refractive dielectric material with a refractive index greater than 1.65, in particular selected from the group consisting of zinc sulfide (ZnS), zinc oxide (ZnO), titanium dioxide ($TiO_2$), carbon (C), indium oxide ($In_2O_3$), indium-tin oxide (ITO), tantalum pentoxide ($Ta_2O_5$), Cerium oxide ($CeO_2$), yttrium oxide ($Y_2O_3$), europium oxide ($Eu_2O_3$), iron oxides such as iron (II,III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or be made from at least one of these materials.

Furthermore, it can be provided that the first structures and/or the second structures are introduced into the carrier layer by means of a shaping device, in particular by means of an embossing roller. A shaping element can be formed with or on a shaping device or an embossing roller, on which shaping element the first and/or the second structures can be formed. Generic shaping elements are generally known to the person skilled in the art. A shaping element can be, for example, a metal sheet or a polymer plate, which preferably have a mirror reflection surface, i.e. a surface with a low surface roughness. Metals such as nickel, steel, brass or polymers such as PMMA, PC, PS, cured UV lacquers or the like are used to produce such a shaping element or master. By means of a shaping element, the first and second structures can, for example, be introduced or pressed or imprinted into a carrier layer comprising UV-curable lacquers. The lacquers are liquid before embossing and solid or cured after embossing. A large number of UV lacquers suitable for this purpose, such as acrylate lacquers, are well known to the person skilled in the art.

In accordance with a particular embodiment, it is also possible for the first structures and/or the second structures to be introduced in a layer applied directly or with the arrangement of a further intermediate layer on the carrier layer, in particular an embossing lacquer layer, by means of a shaping device, in particular by means of an embossing roller. Shaping elements as described above can also be used here. Metals such as nickel, steel, brass or polymers such as PMMA, PC, PS, cured UV lacquers or the like can also be used to produce such a shaping device. By means of a shaping element, the first structures can be introduced, for example, into an embossing lacquer layer comprising UV-curable lacquers.

It may also be expedient if the first structures and/or the second structures are applied directly to the carrier layer, in particular directly to the thermoplastic carrier layer, by means of a shaping element attached to a shaping device, in particular by means of a heated embossing roller, with the application of pressure and/or heat.

According to an advantageous further advancement, it can be provided that the layer, in particular the embossing lacquer layer, with the first structures formed therein and/or the second structures has a thickness of from 0.5 μm to 300 μm, in particular from 0.8 μm to 50 μm, preferably from 1 μm to 10 μm.

In particular, it can be advantageous if the security element has at least one reflective layer on a side of the carrier layer facing away from the first structures and the second structures and/or a reflective layer is arranged between the carrier layer and the first structures and/or a reflective layer is arranged between the carrier layer and the second structures and/or the first structures are coated with at least one reflective layer and/or the second structures are coated with at least one reflective layer, the at least one reflective layer preferably being a metallic material, in particular selected from the group consisting of silver, copper, aluminum, gold, platinum, niobium, tin, or of nickel, titanium, vanadium, chromium, cobalt and palladium or alloys of these materials, in particular cobalt-nickel alloys, or at least one highly refractive dielectric material having a refractive index greater than 1.65, in particular selected from the group consisting of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron(II,III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or is made from at least one of these materials.

Another advantage is an embodiment according to which it can be provided that the second structures are introduced at least partially into the first structures, in particular are embossed or engraved into the first structures. In principle, processes for forming or inserting achromatic structures are known to the person skilled in the art. For example, this can be done by means of laser and in particular by means of laser ablation. The first structures, or the micromirrors, which can be applied to a master or a shaping element, can be overlaid or inscribed with the second, achromatic structures by means of laser ablation.

According to a further advancement, it is possible for the security element to be equipped with machine-readable features, the machine-readable features being, in particular, magnetic coding, electrically conductive layers, electromagnetic wave-absorbing and/or re-emitting substances.

Furthermore, it may be useful if the security element has additional layers, which additional layers comprise, in particular, protective coatings, heat-sealing lacquers, adhesives, primers and/or films.

The object of the present invention is also solved by a process for producing a security element for securities or security papers, in particular a security element according to any one of claims 1 to 18, comprising the following steps:

providing at least one shaping element or at least one shaping device comprising first structures and second structures, wherein the first structures reflect a first piece of information into different spatial regions, so that a movement image is created for a viewer when a light source is moved accordingly and/or when a viewing angle is changed, wherein a movement of the first piece of information is created simultaneously when the light source is moved and/or the viewing angle is changed, and wherein the second structures represent static and/or viewing angle-independent second piece of information providing a carrier layer, or providing a carrier layer with a layer, in particular with an embossing lacquer layer, shaping the first structures and the second structures into the carrier layer or into the layer.

By combining two technologies or two different types of security features, the solution according to the invention substantially increases the protection against counterfeiting of security elements for securities or security papers. The combination of motion effects with static and/or viewing angle-independent features enables a high degree of customizability, respectively a great variety of design possibilities. This is accompanied by a significant increase in protection against counterfeiting.

A shaping element can be arranged on a shaping device or an embossing roller, on which shaping element the first and/or second structures can be formed. Generic shaping elements are generally known to the person skilled in the art.

A shaping element can be, for example, a metal sheet or a polymer plate, which preferably have a mirror reflection surface. Metals such as nickel, steel, brass or polymers such as PMMA, PC, PS, cured UV lacquers or similar are used to manufacture such a shaping element or master.

Static and/or viewing angle-independent structures can be introduced, for example, by means of a laser and in particular by means of laser ablation. The first structures, for example the micromirrors, which can be applied to a master or a shaping element, can be virtually overlaid or inscribed with the second, static and/or viewing angle-independent structures by means of laser ablation. By introducing the second, static and/or viewing angle-independent structures by laser, the positions or arrangement of the structures on the master can always remain the same. The accuracy or precision that can be achieved in this way can further contribute to an additional increase in protection against counterfeiting.

For a better understanding of the invention, it is explained in more detail with reference to the following figures.

Figure 2:
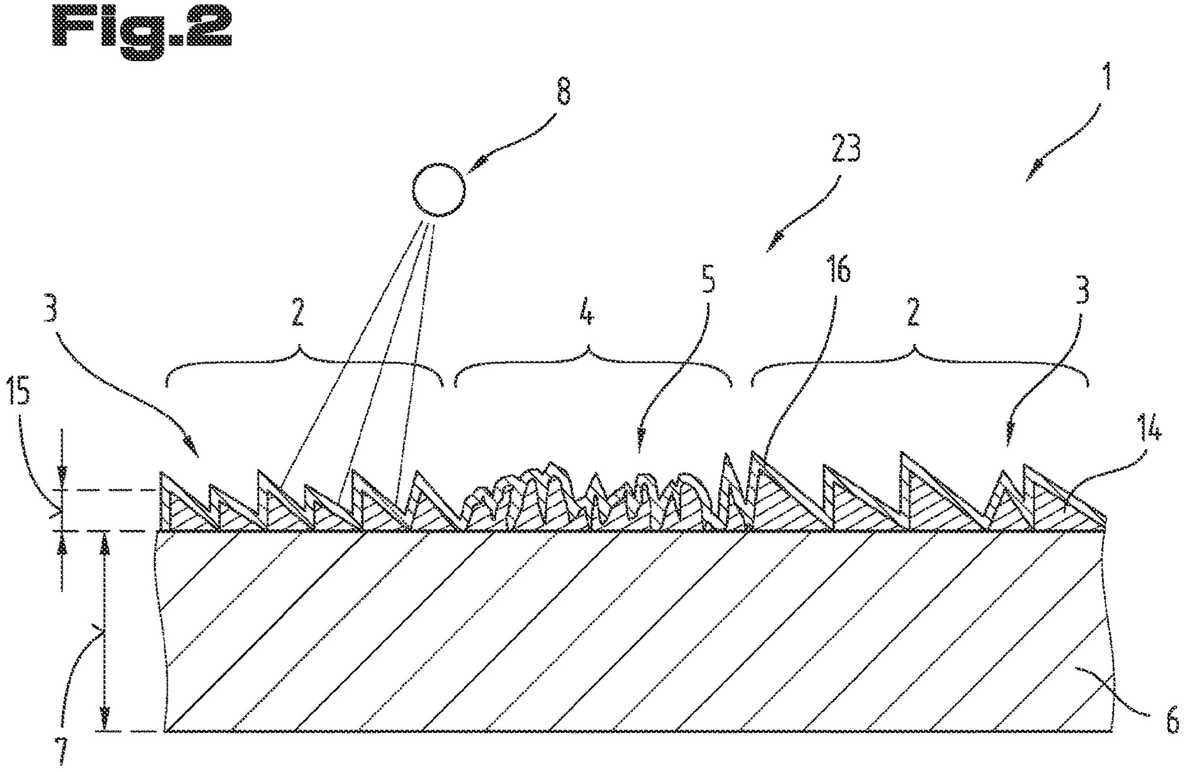
Figure 3:
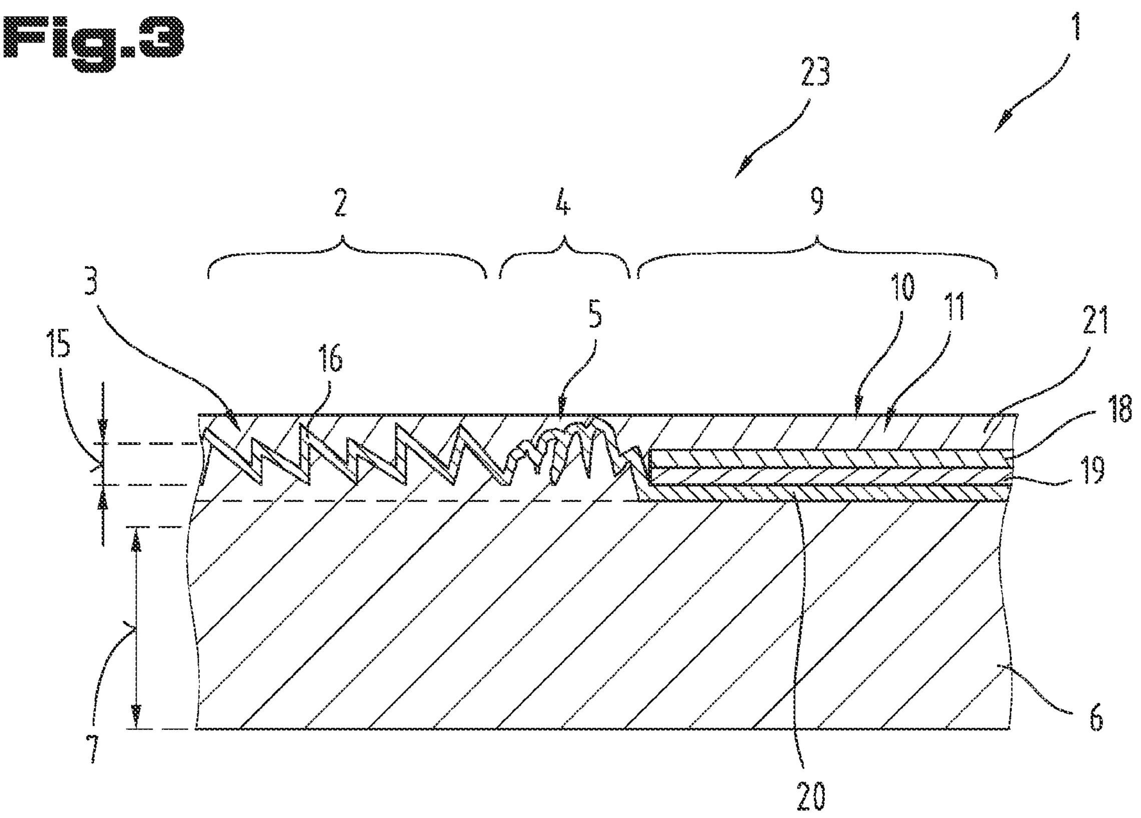
Figure 4:
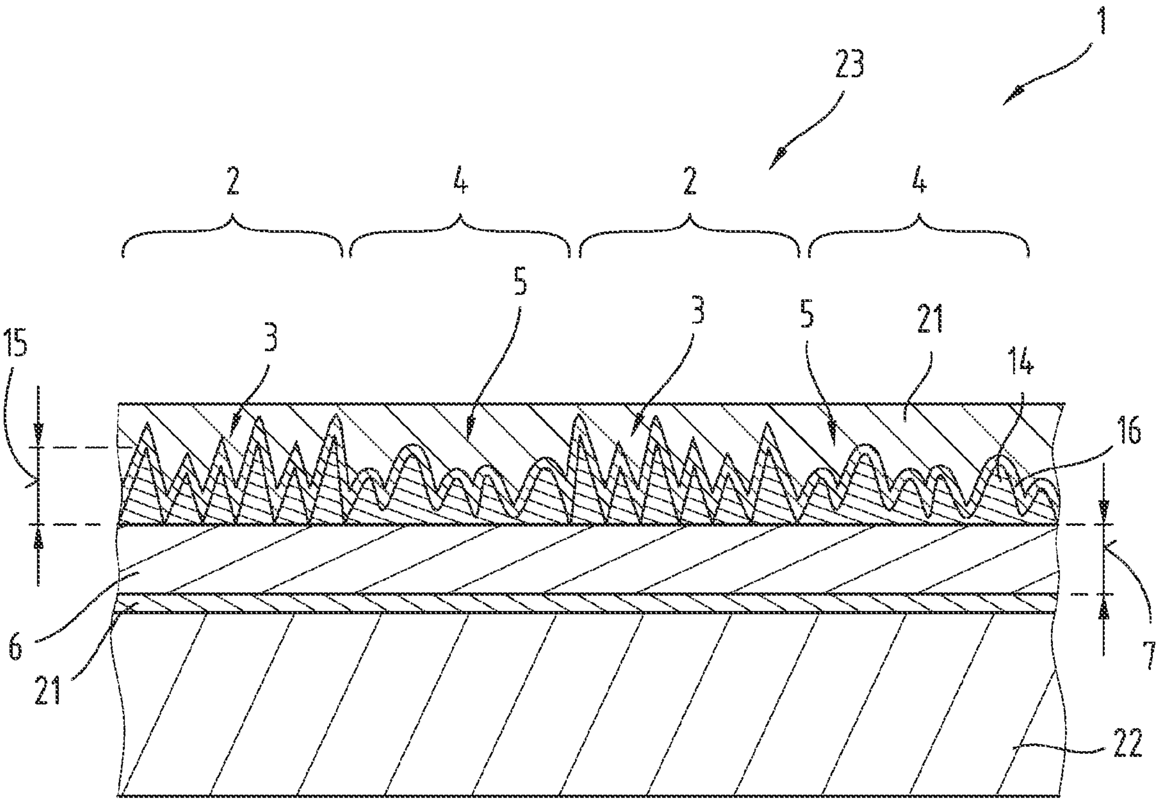
Figure 5:
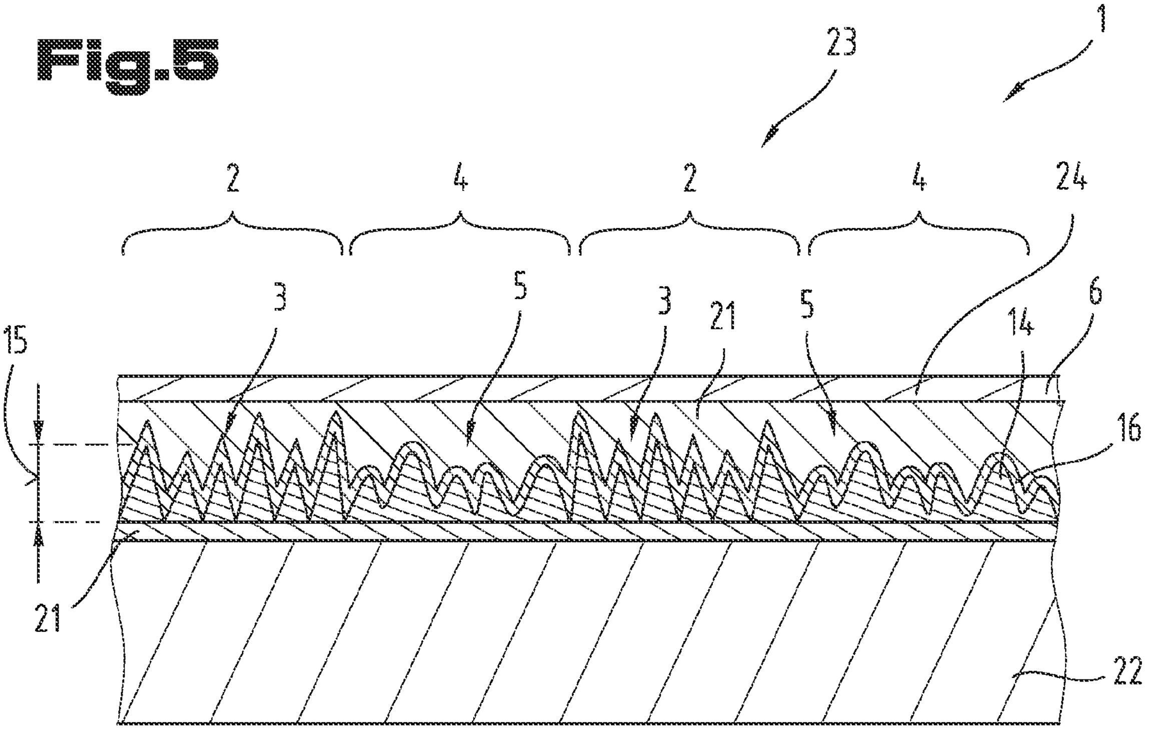
Figure 6:
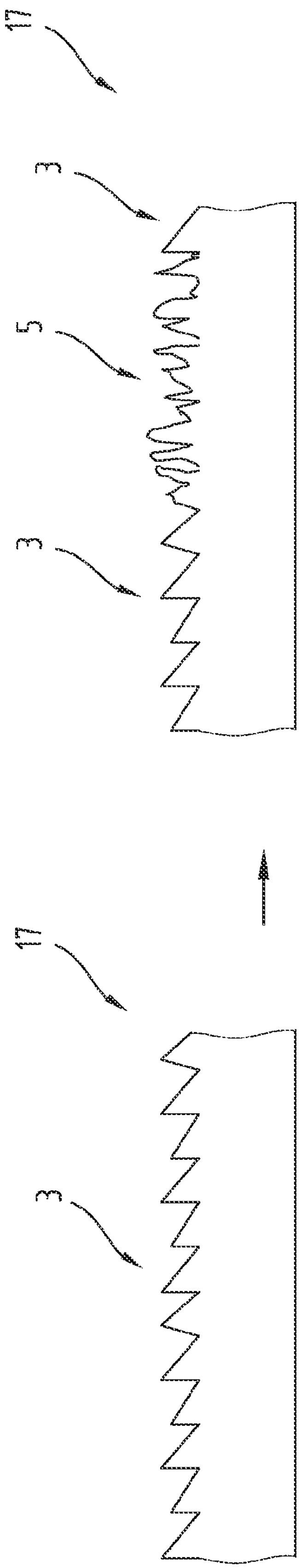

They show in each case in highly simplified, schematic representation:

FIG. 1 a security element in supervision,

FIG. 2 a section through an embodiment of a security element,

FIG. 3 a section through a further embodiment of a security element,

FIG. 4 a section through another embodiment of a security element comprising a security or security paper, FIG. 5 a section through another embodiment of a security element with a security or security paper, FIG. 6 a roughly schematic process flow for the production of a security element, FIG. 7 sections through two further embodiments of a security element.

By way of introduction, it should be noted that in the differently described embodiments, the same parts are provided with the same reference signs or the same component designations, whereby the disclosures contained in the entire description can be transferred mutatis mutandis to the same parts with the same reference signs or the same component designations. Also, the positional indications selected in the description, such as top, bottom, side, etc., are related to the directly described as well as depicted figure, and these positional indications are to be transferred mutatis mutandis to the new position in the event of a change of position.

The term "in particular" is understood in the following to mean a possible more specific design or more detailed specification of an object or a process step, but does not necessarily have to represent a mandatory, preferred embodiment of the same or a mandatory procedure. Further, the term "layer" is generally used to refer to a multi-layer, interconnected composite of components. Thus, each of the layers described below may also comprise multiple, preferably interconnected or adherent layers. To avoid unnecessary repetition, FIGS. 1 to 7 are described at least in part as comprehensive.

In FIG. 1, an example of a possible embodiment of a security element 1 for securities or security papers 22 is shown in a top view. The security element 1 is provided with at least a first region 2 having first structures 3 which first structures 3 reflect a first piece of information into different spatial regions, so that a movement image is created for a viewer with corresponding movement of a light source 8 and/or when an angle of observation is changed, whereby a movement of the first piece of information is simultaneously created upon movement of the light source 8 and/or a change in the viewing angle. Thereby, the first region 2 may comprise the first structures 3 or be formed by them. In addition, the security element 1 with at least one second region 4 having second structures 5 which second structures 5 reflect a static and/or viewing angle-independent second piece of information. The second region 4 can represent the second structures 5 or be formed by them.

The first structures 3 can be formed as diffractive structures, as micromirrors, as facets with optical radiation effect or as achromatic, reflecting structures. The second structures 5 can be formed by diffusely scattering structures, preferably diffusely scattering structures with a size of 1 μm to 100 μm. It is possible that the second region 4 overlays or surrounds the first region 2 at least in sections or partially. It should be emphasized that the first structures 3 and second structures 5 can be both partial and full-surface.

The first piece of information and/or the second piece of information can be a letter, a number, a character, a symbol or a part of an image or pattern. The first piece of information in the exemplary embodiment shown in FIG. 1 is optically variable structures 3 such as micromirrors, which are visible to a viewer when a light source 8 is moved and/or by changing a viewing angle, while the second piece of information is formed as an image or a portrait. In FIG. 1 it is also shown that the first region 2 overlays or surrounds the second region 4 at least in sections.

FIG. 2 shows a section through a conceivable embodiment of a security element 1. The security element 1 is provided with at least one first region 2 having first structures 3 which first structures 3 are formed by optically variable structures such as micromirrors, and which first structures 3 reflect a first piece of information. The security element 1 is provided with at least one second region 4 having second structures 5 which second structures 5 are formed by static and/or viewing angle-independent structures and which second structures 5 reproduce a second piece of information. Thereby, the second region 4 is at least partially surrounded by the first region 2.

The security element 1 can have a carrier layer 6 made of plastic, in particular of a translucent and/or thermoplastic plastic, wherein the carrier layer 6 preferably comprises at least one of the materials from the group consisting of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethyleneimide (PEI), polysulfone (PSU), polyaryletherketone (PAEK), polyethylene naphthalate (PEN), liquid-crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinyl chloride (PVC), ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or blends and/or copolymers of these materials, or may be made from at least one of these materials. The carrier layer 6 may have a thickness 7 of 5 μm to 1000 μm, particularly preferably a thickness 7 of 10 μm to 50 μm.

The first structures 3 can reflect the first piece of information into different spatial regions, so that a movement image is created for the viewer when a light source 8 is moved accordingly and/or when an angle of observation is changed. Thereby, a plurality of the first structures 3 form a group, the orientations of which can be coordinated with one another in such a way that they represent a point of the first piece of information in an observation space, wherein the first piece of information is composed of the sum of all the points represented by the group and wherein, by changing a direction of incidence of the light emitted by the light source 8 and/or when the viewing angle is changed, a movement of the point in the observation space is created. The first piece of information may be, for example, an image motif or a pattern.

By means of a shaping device 12 in particular by means of an embossing roller 13, the first structures 3 and/or the second structures 5 can—as shown—be integrated directly onto the layer 14 applied onto the carrier layer 6 or, alternatively, with the arrangement of a further intermediate layer onto layer 14 applied onto the carrier layer 6, the layer 14 being in particular an embossing lacquer layer. The layer 14, in particular the embossing lacquer layer, with the first structures 3 and/or second structures 5 formed therein can have a thickness 15 of 0.5 μm to 300 μm, in particular 0.8 μm to 50 μm, preferably 1 μm to 10 μm. In FIG. 2 it is shown that, on a visible side 23 of the security element 1, a reflective layer 16 overlaying layer 14 can be formed, with the first structures 3 and/or second structures 5 formed therein. This reflective layer 16 can be full-surface as shown in FIG. 2, but can also be partially formed. In particular, it may be expedient if the reflective layer 16 follows the contours of the first structures 3 and/or the second structures 5. However, it could also be that the security element 1 has at least one reflective layer 16 at a side of the carrier layer 6 facing away from one of the first structures 3 and the second structures 5 and/or between the carrier layer 6 and the first structures 3 and/or the second structures 5. The at least one reflective layer 16 can preferably be a metallic material, in particular selected from the group consisting of silver, copper, aluminum, gold, platinum, niobium, tin, or from nickel, titanium, vanadium, chromium, cobalt and palladium or alloys of these materials, in particular cobalt-nickel alloys, or at least one highly refractive dielectric material having a refractive index greater than 1.65, in particular selected from the group consisting of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers, and/or high refractive index organic polymers, or be made from at least one of these materials. Reflective coatings 16 which have a high refractive index are also known in the art as HRI materials (HRI=High Refractive Index).

The second structures 5 can be diffusely scattering. Advantageously, the second structures 5 are introduced at least partially into the first structures 3 in particular embossed or engraved into the first structures 3.

It may also be the case that the security element 1 is equipped with machine-readable features. The machine-readable features may in particular be magnetic encodings, electrically conductive layers, electromagnetic wave absorbing and/or re-emitting substances.

In FIGS. 3 to 5, as well as in FIG. 7, further and possibly independent embodiments of the security element are shown, again using the same reference signs or component designations for the same parts as in the preceding FIGS. 1 and 2. In order to avoid unnecessary repetition, reference is made to the detailed description in the preceding figures.

In FIG. 3, a security element 1 is shown which is provided with at least one third region 9 having third structures 10 which third structures 10 being formed by a layer with color-tipping pigments, in particular interference pigments, pigments with a color-tipping thin-film structure 11 or liquid-crystal pigments, or by a layer with a color-tipping thin-film structure 11 and/or in that the third structures 10 are formed by at least one liquid-crystal layer, in particular a cholesteric liquid-crystal layer, and/or in that the third structures 10 are formed on one side facing away from the visible side 23 with at least one layer which enhances a color tipping effect, and/or in that the third structures 10 contain metallic pigments and/or magnetic pigments and/or color pigments and/or dyes, and which third structures 10 reproduce a third piece of information, wherein the first region 2 and the third region 9 and/or the second region 4 and the third region 9 at least partially overlay each other. The arrangement or application of the third structures 10 or of components or partial layers of the third structures 10 onto the security element 1 or onto the first structures 3 and/or second structures 5 can be carried out, for example, by a printing process and/or a vapor deposition process or by several of these.

In particular, the exemplary embodiment according to FIG. 3 is formed with a color-tipping thin-film structure 11. For example, the color-tipping thin-film structure 11 can have at least one absorber layer 18 and at least one distance layer 19 made of a dielectric material. In addition, it is conceivable that the thin-film structure comprises at least one reflective layer 20 wherein the distance layer 19 between reflection layer 20 and absorber layer 18 can be arranged. The reflective layer 20 can overlay partially or over the entire surface the carrier layer 6. Thus, it is possible that the reflective layer 20 is also formed as a reflective layer 16 between the carrier layer 6 and the first structures 3 and second structures 5, respectively between the carrier layer 6 and the layer 14 with the first structures 3 and/or second structures 5 formed therein.

Figure 7A:
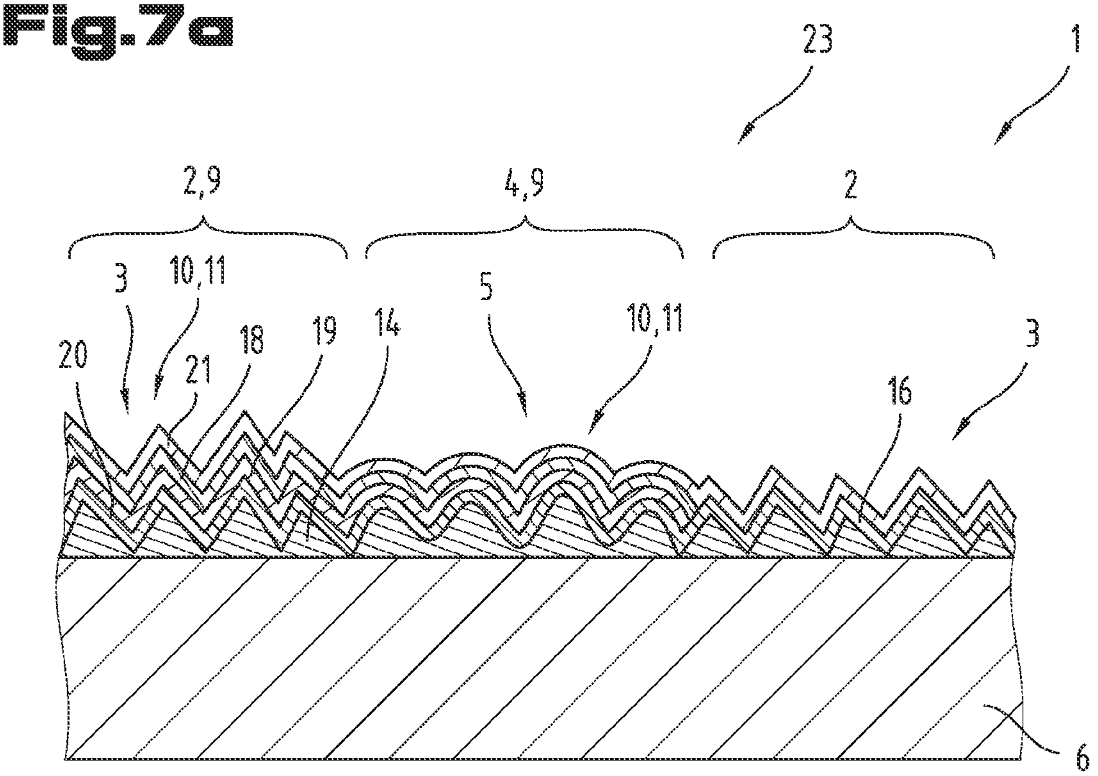
Figure 7B:
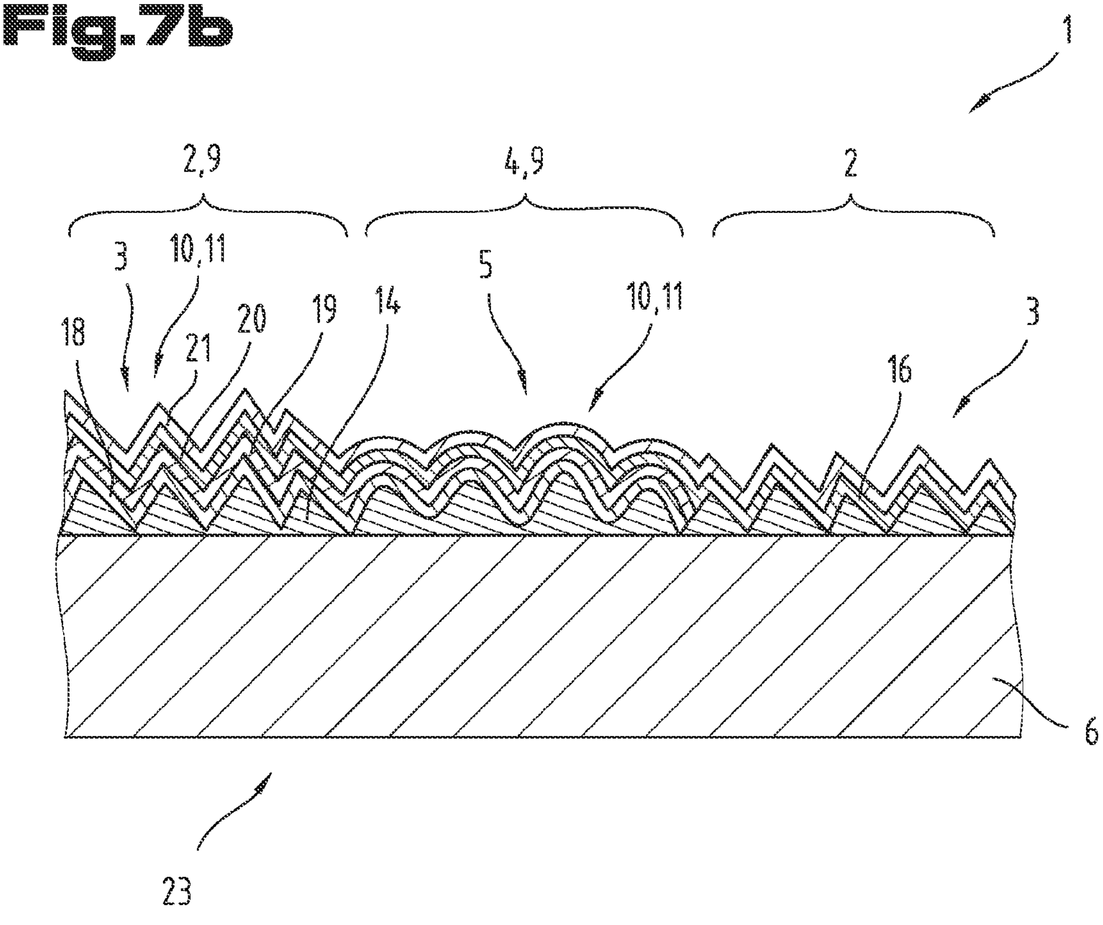

However, it is also possible that a color-tipping thin-film structure 11 at least partially overlays the first structures 3 and/or the second structures 5. A possible embodiment is shown by way of example in FIGS. 7*a* and 7*b*. Here, both the first structures 3 as well as the second structures 5 are partially covered by the thin-film structure 11. Depending on which side of the security element 1 is considered or used as the visible side 23, different sequences of layers are conceivable or expedient. For example, as shown in FIG. 7*a*, a structure with a sequence described from bottom to top "layer 14 having embossed therein first 3 and/or second structure 5—reflective layer 20—distance layer 19—absorber layer 18" can be provided. Alternatively, a structure according to the example in FIG. 7*b* would also be conceivable, in which, viewed from bottom to top, a sequence of "layer 14 having first 3 and/or second structure 5—absorber layer 18—distance layer 19—reflective layer 20" is shown. The visible side 23 is always that side from which a viewer of the absorber layer 18 looks towards the reflective layer 20.

As an alternative to the embodiment shown in FIG. 2, the security element 1 in FIG. 3 does not have an additional layer 14 applied to the carrier layer 6, into which additional layer 14 the first structures 3 and second structures 5 are inserted. The first structures 3 and second structures 5 in FIG. 3 are directly inserted into the carrier layer 6 and embossed therein, respectively.

The security element 1 can also have additional layers 21 which additional layers 21 particularly include protective lacquers, heat-seal lacquers, adhesives, primers and/or films. For example, a layer 21 can be formed as a top layer on a visible side 23 of the security element 1.

FIGS. 4 and 5 each show a section through two further exemplary embodiments of security elements 1 with a security or a security paper 22.

FIG. 4 shows that the security element 1 is arranged with its side of the carrier layer 6 facing away from the visible side 23 on a security or a security paper 22. An additional layer 21 is formed on the side of the carrier layer 6 facing away from the visible side 23, which additional layer 21 can be formed as an adhesion layer or adhesive layer, respectively. Furthermore, a reflective layer 16 is formed on the visible side 23 of the security element 1, the first structures 3 and the second structures 5 being coated with the reflective layer 16.

The uppermost layer, i.e. the outermost layer as viewed from the visible side 23, can be a layer 21 as a protective layer which protects the entire layer structure and/or ply structure from mechanical damage such as scratches, scores or the like. However, it may also be the case that a layer 21 formed as a protective layer does not form the outermost layer of the layer structure, but that this is surrounded by a layer 21 in the form of an adhesive layer or glue layer. Preferably, a flat surface of the security element 1 can be achieved by means of the layer 21 formed as a protective layer, as shown by way of example in FIGS. 3 and 4. However, it may also be expedient if a layer 21 formed as a protective layer follows a contour of the structures 3, 5, 10. This is shown in FIG. 7.

As an alternative to the exemplary embodiment shown in FIG. 4, it is also possible, as shown in FIG. 5, that the carrier layer 6 of the security element 1 is formed as a removable or peelable transfer film 24. It is of course also conceivable that the carrier layer 6, if it is arranged facing the visible side 23 of the security element 1, is transparent or at least translucent. Advantageously, the carrier layer 6 can also perform the functions of a layer 21 formed as a protective layer. However, as shown in FIG. 5, a layer 21 formed as a protective layer can also be additionally provided between the first and second structures 3, 5 and the carrier layer 6 or between the layer 16 and the carrier layer 6, respectively. Thus, according to FIG. 5, the security element 1 can be applied on the security or security paper 22 with its side facing away from the visible side 23. For this purpose, if necessary, an additional layer 21 can be formed, which additional layer 21 can be formed as an adhesion layer or adhesive layer.

FIG. 6 shows a rough schematic process flow for the production of a security element 1 for a security or security paper 22. The outlined process is particularly suitable for producing a security element according to any one of claims 1 to 18.

The process first provides that a shaping element 17 comprising first structures 3 and second structures 5 is provided. The first structures 3 are formed in such a way that they reflect a first piece of information into different spatial regions, so that a movement image is created for a viewer when there is corresponding movement of a light source 8 and/or when a viewing angle is changed, whereby a movement of the first piece of information is simultaneously created when there is a movement of the light source 8 and/or a change in the viewing angle.

The second structures 5 reproduce a static and/or viewing angle-independent second piece of information. Furthermore, a carrier layer 6 is provided. Alternatively, as shown in the figures, a carrier layer 6 can thereby be created comprising a layer 14 in particular an embossing lacquer layer. In accordance with the invention, the first structures 3 and the second structures 5 are also shaped into the carrier layer 6 or into the layer 14.

In a possible variation of the manufacturing process, it may be convenient that a shaping element 17 or master is formed having first structures 3 with movement effect, such as micromirrors, and that a second shaping element 17 or a second master having static and/or viewing angle-independent, in particular diffusely scattering, second structures 5 engraved by laser ablation is formed. These two masters can be copied and duplicated as often as desired and arranged next to each other in an expedient manner Thus an arrangement on a shaping device 12 such as an embossing roller 13 or a shim and subsequently embossing into a layer 14, in particular a UV-curable layer or embossing lacquer layer can take place.

In a further variant of the manufacturing process, it may also be that a shaping element 17 or master having first structures 3 is provided and that in or also next to these first structures 3 the second structures 5 are introduced, for example by means of laser ablation. A master created in this way can also be duplicated in one or more subsequent steps, the execution of such copying steps from the positive to the negative and vice versa being fundamentally familiar to those skilled in the art. The first and second structures 3, 5 can then be arranged on a shaping device 12, such as an embossing roller 13 or a shim, and embossed into a layer 14, in particular a UV-curable layer, or embossing lacquer layer.

It may also be appropriate if a finished shaping device 12 or embossing roller 13 or a finished shim is only described subsequently for the insertion of the second structures 5 by means of a laser. This can provide additional advantageous customization.

In the course of further process steps, various further processing steps can be provided on the security element 1. For example, further layers can be applied, as indicated by FIGS. 2 to 5. The exemplary embodiments show possible variants of embodiment, whereby it should be noted at this point that the invention is not restricted to the specifically illustrated variants of embodiment thereof, but rather various combinations of the individual variants of embodiment are also possible and this possibility of variation is within the ability of the skilled person working in the art due to the teaching for technical action by the present invention.

The scope of protection is determined by the claims. However, the description and the figures are to be consulted for the interpretation of the claims. Individual features or combinations of features from the different exemplary embodiments shown and described may constitute independent inventive solutions in their own right. The object underlying the independent inventive solutions can be taken from the description.

All indications of value ranges in the present description are to be understood as including any and all subranges thereof, e.g. the indication 1 to 10 is to be understood as including all subranges starting from the lower limit 1 and the upper limit 10, i.e. all subranges start with a lower limit of 1 or greater and end with an upper limit of 10 or less, e.g. 1 to 1.7, or 3.2 to 8.1, or 5.5 to 10.

Finally, for the sake of order, it should be noted that, for a better understanding of the configuration, elements have been shown partially out of scale and/or enlarged and/or reduced in size.

LIST OF REFERENCE SIGNS

1 security element
2 first region
3 first structure
4 second region
5 second structure
6 carrier layer
7 thickness
8 light source
9 third region
10 third structure
11 thin-film structure
12 shaping device
13 embossing roller
14 layer
15 thickness
16 reflective layer
17 shaping element
18 absorber layer
19 Distance layer
20 reflective layer
21 layer
22 security or security paper
23 visible side
24 transfer film

The invention claimed is:

1. A security element for securities or security papers, wherein the security element is formed with at least a first region having first structures, which first structures reflect a first piece of information into different spatial regions, so that a moving image is created for a viewer with corresponding movement of a light source and/or when a viewing angle is changed, wherein a movement of the first piece of information is simultaneously created upon movement of the light source and/or a change in the viewing angle, wherein the security element is formed with at least one second region having second structures, which second structures reproduce a static and/or viewing angle-independent second piece of information, and wherein the second structures are formed by diffusely scattering structures, wherein the diffusely scattering structures have a size of 1 μm to 100 μm.

2. The security element according to claim 1, wherein the first structures are formed as diffractive structures, as micromirrors, as beam-optically effective facets or as achromatic, reflective structures.

3. The security element according to claim 1, wherein the first region surrounds the second region at least in sections.

4. The security element according to claim 1, wherein the first piece of information and/or the second piece of information is formed as a letter, number, character, symbol or part of an image or pattern.

5. The security element according to claim 1, comprising a carrier layer made of plastic.

6. The security element according to claim 5, wherein the carrier layer has a thickness of 5 μm to 1000 μm.

7. The security element according to claim 5, wherein the first structures and/or the second structures are inserted into the carrier layer with a shaping device.

8. The security element according to claim 5, wherein the first structures and/or the second structures are applied directly to the carrier layer or with an arrangement of a further intermediate layer with a shaping device.

9. The security element according to claim 8, wherein the layer with the first structures and/or second structures formed therein has a thickness of 0.5 μm to 300 μm.

10. The security element according to claim 5, wherein the security element has at least one reflective layer on a side of the carrier layer facing away from the first structures and the second structures and/or has a reflective layer arranged between the carrier layer and the first structures, and/or has a reflective layer arranged between the carrier layer and the second structures and/or the first structures are coated with at least one reflective layer and/or the second structures are coated with at least one reflective layer.

11. The security element according to claim 1, wherein the second structures are inserted into the first structures at least in sections.

12. The security element according to claim 1, wherein the security element is provided with machine-readable features.

13. The security element according to claim 1, wherein the security element comprises additional layers.

14. A process of manufacturing the security element for securities or security papers according to claim 1, comprising the steps of:

providing at least one shaping element or at least one shaping device comprising first structures and second structures, wherein the first structures reflect a first piece of information into different spatial regions, so that a moving image is created for a viewer with a corresponding movement of a light source and/or a change in a viewing angle, wherein a movement of the first piece of information is simultaneously created upon the movement of the light source and/or change in the viewing angle, and wherein the second structures reproduce a static and/or viewing angle-independent second piece of information, providing a carrier layer, or providing a carrier layer with a layer, and shaping the first structures and the second structures into the carrier layer or into the layer.

15. A security element for securities or security papers, wherein the security element is formed with at least a first region having first structures, which first structures reflect a first piece of information into different spatial regions, so that a moving image is created for a viewer with corresponding movement of a light source and/or when a viewing angle is changed, wherein a movement of the first piece of information is simultaneously created upon movement of the light source and/or a change in the viewing angle, wherein the security element is formed with at least one second region having second structures, which second structures reproduce a static and/or viewing angle-independent second piece of information, wherein a plurality of said first structures form a group whose orientations are matched to one another in such a way that they map a point of the first piece of information in an observation space, the first piece of information being composed of a sum of all points represented by the group, and a movement of the point in the observation space being generated by changing a direction of incidence of light emitted by the light source and/or changing the viewing angle.

16. A security element for securities or security papers, wherein the security element is formed with at least a first region having first structures, which first structures reflect a first piece of information into different spatial regions, so that a moving image is created for a viewer with corresponding movement of a light source and/or when a viewing angle is changed, wherein a movement of the first piece of information is simultaneously created upon movement of the light source and/or a change in the viewing angle, wherein the security element is formed with at least one second region having second structures, which second structures reproduce a static and/or viewing angle-independent second piece of information, wherein the security element is formed with at least one third region having third structures, which third structures are formed by a layer with color-shifting pigments, pigments with a color-shifting thin-film structure or liquid-crystal pigments, or by a layer with a color-shifting thin-film structure, and/or the third structures are formed by at least one liquid-crystal layer and/or wherein the third structures are formed on a side faced away from a visible side with at least one layer which enhances a color tilt effect, and/or wherein the third structures contain metallic pigments and/or magnetic pigments and/or color pigments and/or dyes, and which third structures reproduce a third piece of information, wherein the first region and the third region and/or the second region and the third region overlay each other at least partially.

17. The security element according to claim 16, wherein the third structures are formed with a layer containing color-shifting pigments or with a color-shifting thin-film structure comprising at least one absorber layer and at least one distance layer.

18. The security element according to claim 17, wherein the color-shifting thin-film structure comprises at least one reflective layer, and the distance layer is arranged between the reflective layer and the absorber layer.

* * * * *